(12) United States Patent
Patil et al.

(10) Patent No.: US 9,179,358 B2
(45) Date of Patent: Nov. 3, 2015

(54) TECHNIQUES FOR REDUCING NETWORK CONGESTION IN A WIRELESS COMMUNICATIONS SYSTEM

(71) Applicant: QUALCOMM Incorporated, San Diego, CA (US)

(72) Inventors: Kiran Patil, San Diego, CA (US); Shyamal Ramachandran, San Diego, CA (US); Nitin Pant, San Diego, CA (US); Arun Prasanth Balasubramanian, Hyderabad (IN); Venkata Sampath Kumar Mummadi, San Diego, CA (US); Daniel Amerga, San Diego, CA (US); Srivatsa V. Chivukula, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 66 days.

(21) Appl. No.: 14/093,747

(22) Filed: Dec. 2, 2013

(65) Prior Publication Data

US 2014/0177429 A1 Jun. 26, 2014

Related U.S. Application Data

(60) Provisional application No. 61/745,176, filed on Dec. 21, 2012.

(51) Int. Cl.
*H04W 28/02* (2009.01)
*H04W 76/02* (2009.01)
*H04W 24/04* (2009.01)

(52) U.S. Cl.
CPC ...... *H04W 28/0289* (2013.01); *H04W 28/0205* (2013.01); *H04W 76/027* (2013.01); *H04W 24/04* (2013.01)

(58) Field of Classification Search
None
See application file for complete search history.

(56) References Cited

U.S. PATENT DOCUMENTS 7,954,010 B2 5/2011 Beattie, Jr. et al.
8,339,987 B2 12/2012 Tanaka et al.
(Continued)

FOREIGN PATENT DOCUMENTS

EP 2475214 A1 7/2012
GB 2431069 A 4/2007
(Continued)

OTHER PUBLICATIONS

IPEA, Second Written Opinion of the International Preliminary Examining Authority, Int'l. App. No. PCT/US2013/073791, Dec. 22, 2014, European Patent Office, Berlin, DE, 6 pgs.
(Continued)

*Primary Examiner* — Mohammad Adhami
(74) *Attorney, Agent, or Firm* — Holland & Hart LLP

(57) ABSTRACT

Methods, systems, and devices are described for reducing congestion in a wireless communications system. A second connection failure is detected, and a difference between a timestamp of the second connection failure and a timestamp of a first connection failure is calculated. Upon determining that the difference satisfies a first time threshold, information relating to one or more previous connection failures is cleared. A time period is identified. A number of connection failures from a cell that occur during the time period is identified. A determination is made as to whether the number of connection failures satisfies a threshold. Upon determining that the number of connection failures satisfies the threshold, a future connection request may be withheld for a time period.

30 Claims, 11 Drawing Sheets

(56) References Cited

U.S. PATENT DOCUMENTS

| | | | |
|---|---|---|---|
| 8,355,730 B2 | 1/2013 | Nakata | |
| 2010/0190499 A1* | 7/2010 | Wu | 455/436 |
| 2011/0039587 A1* | 2/2011 | Madhavan et al. | 455/466 |
| 2012/0159519 A1* | 6/2012 | Matsuda | 719/318 |
| 2013/0084809 A1 | 4/2013 | Johansson et al. | |
| 2013/0143571 A1 | 6/2013 | Iwamura et al. | |
| 2013/0143615 A1* | 6/2013 | Juang et al. | 455/522 |
| 2013/0272139 A1* | 10/2013 | Guo et al. | 370/242 |
| 2014/0329529 A1* | 11/2014 | Jung et al. | 455/436 |

FOREIGN PATENT DOCUMENTS

| | | | |
|---|---|---|---|
| WO | WO-2004043092 | A1 | 5/2004 |
| WO | WO-2009148378 | A1 | 12/2009 |

OTHER PUBLICATIONS

ISA/EPO, International Search Report and Written Opinion of the International Searching Authority, Int'l. App. No. PCT/US2013/073791, Jun. 20, 2014, European Patent Office, Rijswijk, NL 9 pgs.

* cited by examiner

TECHNIQUES FOR REDUCING NETWORK CONGESTION IN A WIRELESS COMMUNICATIONS SYSTEM

CROSS REFERENCES

The present Application for patent claims priority benefit of U.S. Provisional Patent Application No. 61/745,176, entitled "Reducing Network Congestion in a Wireless Communications System" by Patil et al., filed Dec. 21, 2012, assigned to the assignee hereof, and expressly incorporated by reference herein.

FIELD OF THE DISCLOSURE

The present disclosure is related to wireless communications. More specifically, the present disclosure is directed to the techniques for reducing network congestion in a wireless communications system.

BACKGROUND

Wireless communication networks are widely deployed to provide various communication services such as voice, video, packet data, messaging, broadcast, and the like. These wireless networks may be multiple-access networks capable of supporting multiple users by sharing the available network resources.

A wireless communication network may include a number of base stations or NodeBs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

The UE may attempt to connect to the base station by transmitting a connection request on the uplink. If a connection failure is received on the downlink in response to the connection request, the UE may continue to transmit additional connection requests. The transmittal of the additional connection requests increases the congestion of a communications network.

SUMMARY

Techniques are described for reducing congestion in a wireless communications system. In one example, a second connection failure (e.g., a current connection failure) at a UE may be detected. A difference between a timestamp of the connection failure and a previously stored timestamp of a first connection failure (e.g., a previous connection failure) is calculated. A determination may be made as to whether the calculated difference between the timestamps satisfies a time threshold. Upon determining that the difference satisfies the time threshold, information relating to one or more previous connection failures is modified. For example, information relating to one or more previous connection failures may be cleared. For example, a counter that maintains a count of detected connection failures may be cleared (e.g., reset to zero). Further, a number of connection failures that occur during an identified time period may be identified. A determination is made as to whether the number of connection failures satisfies the counter threshold within the identified time period. Upon determining that the number of connection failures satisfies the counter threshold within the identified time period, a future connection request may be withheld for a time period. For example, the future connection request may be withheld for a back off time or a barring time. In one example, the back off time may be less than the barring time. The determination of whether to withhold the future connection request for the back off time or the barring time may depend on the whether the difference in timestamps of the second connection failure and the first connection failure satisfies the time threshold.

In one example, a method to reduce congestion in a wireless communications system is described. A second connection failure may be detected at a user equipment UE. A first difference between a timestamp of the second connection failure and a previously stored timestamp of a first connection failure may be calculated. Upon determining that the first difference satisfies a first time threshold, stored information at the UE relating to at least the first connection failure may be modified.

In one example, modifying the stored information relating to at least the first connection failure includes clearing information relating to one or more previous connection failures or adjusting a weight associated with the one or more previous connection failures. The one or more previous connection failures may include the first connection failure. In one example, clearing information relating to one or more previous connections may include resetting a counter of connection failures, clearing stored timestamps of the one or more previous connection failures, or updating a previously stored timestamp of an earliest connection failure to occur during a time period with the timestamp of the second connection failure and initializing a counter of connection failures. The second connection failure may be the earliest connection failure to occur during the time period.

Upon determining that the first difference fails to satisfy the first time threshold, a previously stored timestamp of a last connection failure to occur during a time period may be updated with the timestamp of the second connection failure and a counter of connection failures may be incremented. The second connection failure may be the last connection failure to occur during the time period.

A determination may be made as to whether the counter of connection failures satisfies a counter threshold. Upon determining that the counter of connection failures satisfies the counter threshold, a second difference may be calculated between the timestamp of the last connection failure to occur during the time period and a timestamp of an earliest connection failure to occur during the time period. The first connection failure may be the earliest connection failure to occur during a time period.

A determination may also be made as to whether the second difference satisfies a second time threshold. Upon determining that the second difference fails to satisfy the second time threshold, a future connection request may be withheld for a back off time. Upon determining that the second difference satisfies the second time threshold, the future connection request may be withheld for a barring time. The barring time may be greater than the back off time. In one example, the second connection failure may occur subsequently to an occurrence of the first connection failure.

A user equipment (UE) configured to reduce congestion in a wireless communications system is also described. The UE may include a processor and memory in electronic communication with the processor. Instructions may be stored in the memory. The instructions may be executable by the processor to detect a second (e.g., current) connection failure at the UE, and calculate a first difference between a timestamp of the second connection failure and a previously stored timestamp of a first (e.g., previous) connection failure. Upon determining that the first difference satisfies a first time threshold, the instructions may be executable by the processor to modify stored information at the UE relating to at least the first connection failure.

An apparatus to reduce congestion in a wireless communications system is also described. The apparatus may include means for detecting a second (e.g., current) connection failure at a user equipment (UE), and means for calculating a first difference between a timestamp of the second connection failure and a previously stored timestamp of a first (e.g., previous) connection failure. Upon determining that the first difference satisfies a first time threshold, the apparatus may also include means for modifying stored information at the UE relating to at least the first connection failure.

A computer program product for reducing congestion in a wireless communications system is also described. The computer program product may include a non-transitory computer-readable medium storing instructions executable by a processor to detect a second (e.g., current) connection failure at a user equipment (UE), calculate a first difference between a timestamp of the second connection failure and a previously stored timestamp of a first (e.g., previous) connection failure, and upon determining that the first difference satisfies a first time threshold, modify stored information at the UE relating to at least the first connection failure.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Described examples are directed to techniques for reducing congestion of a wireless communication network. A UE may receive a connection failure in response to a request to join the communication network. In response to receiving a connection failure, the UE may send another request to join the network. The UE may maintain a count of the number of connection failures received during a time period. In one example, the UE may withhold sending future connection requests if the number of connection failures satisfies a threshold. Withholding future connection requests prevents a UE from continuing to send connection requests and may reduce network congestions. In addition, the UE may reset a counter that maintains the number of connection failures if the time between the receipt of connection failures satisfies a threshold. Resetting the counter prevents the count of connection failures from satisfying the threshold prematurely when the network may be momentarily congested.

The following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

Figure 1:
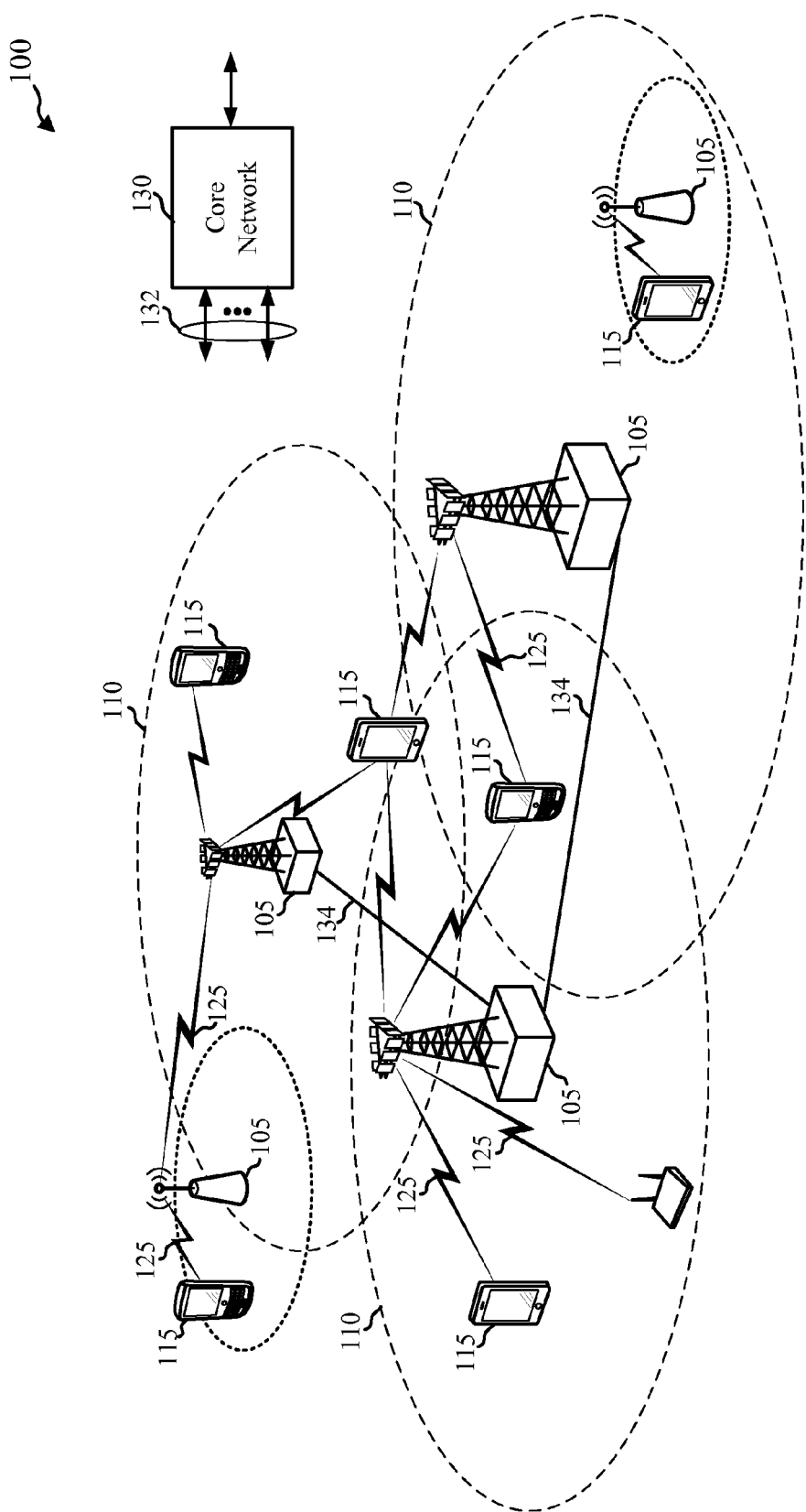
FIG. 1 is a block diagram illustrating one example of a wireless communications system, in accordance with various aspects of the present disclosure.

FIG. 1 is a block diagram illustrating one example of a wireless communications system 100, in accordance with various aspects of the present disclosure. The wireless communications system 100 includes base stations (or cells) 105, user equipments (UEs) 115, and a core network 130. The base stations 105 may communicate with the UEs 115 under the control of a base station controller, which may be part of the core network 130 or the base stations 105 in various examples. Base stations 105 may communicate control information and/or user data with the core network 130 through core network backhaul links 132. In some examples, the base stations 105 may communicate, either directly or indirectly, with each other over base station backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to various radio technologies. Each modulated signal may be sent on a different carrier and may carry control information (e.g., reference signals, control channels, etc.), overhead information, data, etc.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a basic service set (BSS), an extended service set (ESS), a NodeB, an evolved NodeB (eNodeB or eNB), Home NodeB, a Home eNodeB, or some other suitable terminology. The geographic coverage area 110 for a base station may be divided into sectors making up only a portion of the coverage area. The wireless communications system 100 may include base stations 105 of different types (e.g., macro, micro, and/or pico base stations). There may be overlapping coverage areas for different technologies.

In examples, the wireless communications system 100 is an LTE/LTE-A network. In LTE/LTE-A networks, the terms evolved Node B (eNB) may be generally used to describe the base stations 105. The wireless communications system 100 may be a Heterogeneous LTE/LTE-A network in which different types of eNBs provide coverage for various geographical regions. For example, each base station 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the base stations 105 via one or more core network backhaul links 132 (e.g., S1, etc.). The base stations 105 may also communicate with one another, e.g., directly or indirectly via one or more base station backhaul links 134 (e.g., X2, etc.) and/or via core network backhaul links 132 (e.g., through core network 130). The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The UEs 115 are dispersed throughout the wireless communications system 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The communication links 125 shown in the wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. The UE 115 may send a connection request to communicate with a particular base station 105. The base station 105 may reject the request if the cell is congested. Upon receiving the rejection, the UE 115 may control when to retransmit a connection request in order to avoid adding additional congestion. While the wireless communications system 100 is described in relation to LTE/LTE-Advanced architectures, those skilled in the art will readily appreciate, the various concepts presented throughout this disclosure may be extended to other types of wireless networks.

Figure 2:
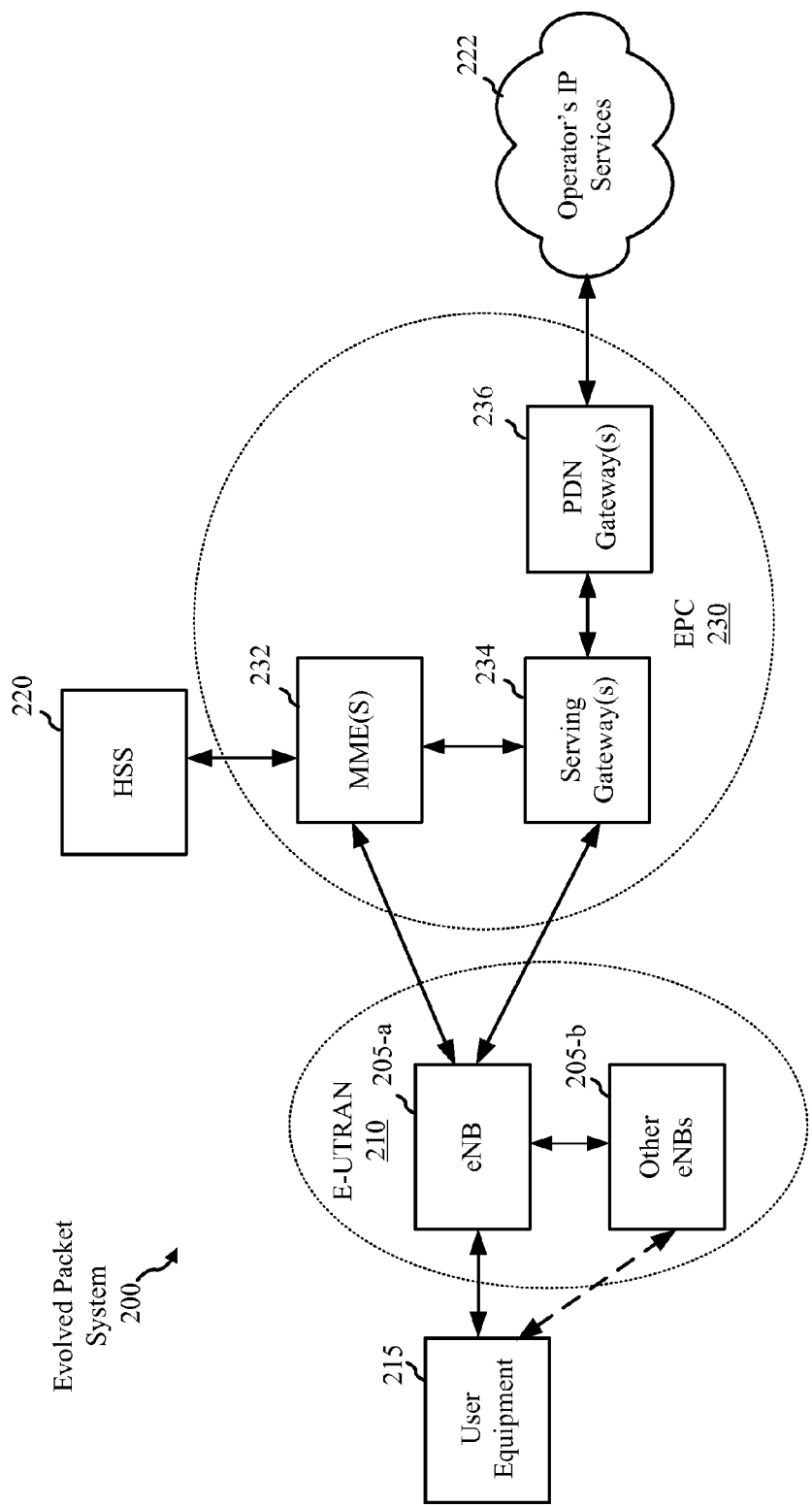
FIG. 2 is a diagram illustrating an LTE/LTE-Advanced network architecture, in accordance with various aspects of the present disclosure.

FIG. 2 is a diagram illustrating an LTE/LTE-Advanced network architecture, in accordance with various aspects of the present disclosure. The LTE/LTE-Advanced network architecture may be referred to as an Evolved Packet System (EPS) 200. The EPS 200 may include one or more UEs 215, an Evolved UMTS Terrestrial Radio Access Network (E-UTRAN) 210, an Evolved Packet Core (EPC) 230, a Home Subscriber Server (HSS) 220, and an Operator's IP Services 222. The EPS 200 may interconnect with other access networks. As shown, the EPS 200 provides packet-switched services, however, as those skilled in the art will readily appreciate, the various concepts presented throughout this disclosure may be extended to networks providing circuit-switched services.

The E-UTRAN 210 may include a first eNB 205-a and other eNBs 205-b. The first eNB 205-a and other eNBs 205-b may be examples of one or more the base stations 105 described in FIG. 1. In one example the first eNB 205 may provide user and control plane protocol terminations toward the UE 215. The UE 215 may be an example of one or more of the UEs 215 described in FIG. 1. The first eNB 205-a may be connected to the other eNBs 205-b via an X2 interface (e.g., backhaul). The first eNB 205-a may provide an access point to the EPC 230 for the UE 215. The first eNB 205-a may be connected by an S1 interface to the EPC 230. The EPC 230 may include one or more Mobility Management Entities (MMES) 232, one or more Serving Gateways 234, and one or more Packet Data Network (PDN) Gateways 236. The MME 232 may be a control node that processes the signaling between the UE 215 and the EPC 230. Generally, the MME 232 may provide bearer and connection management. User IP packets may be transferred through the one or more Serving Gateways 234, which may be connected to the one or more PDN Gateways 236. The one or more PDN Gateways 236 may provide UE IP address allocation as well as other functions. The one or more PDN Gateways 236 may be connected to the Operator's IP Services 222. The Operator's IP Services 222 may include the Internet, an Intranet, an IP Multimedia Subsystem (IMS), and/or a Packet-Switched (PS) Streaming Service (PSS).

The UE 215 may collaboratively communicate with the first eNB 205-a and the other eNBs 205-b through, for example, Multiple Input Multiple Output (MIMO), Coordinated Multi-Point (CoMP), or other schemes. MIMO techniques use multiple antennas on the base stations and/or multiple antennas on the UE to take advantage of multipath environments to transmit multiple data streams. CoMP includes techniques for dynamic coordination of transmission and reception by a number of eNBs to improve overall transmission quality for UEs as well as increasing network and spectrum utilization.

Figure 3:
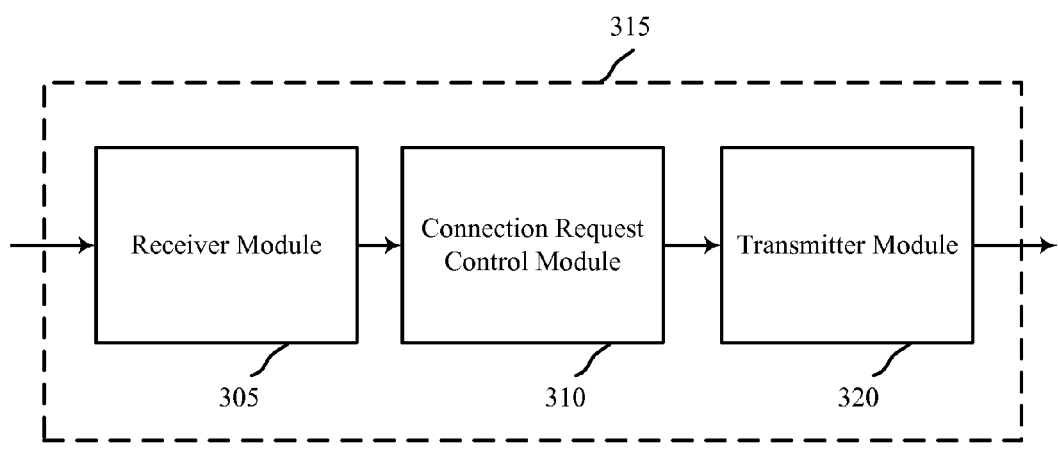
FIG. 3 is a block diagram illustrating one example of a user equipment (UE), in accordance with various aspects of the present disclosure.

FIG. 3 is a block diagram 300 illustrating one example of a UE 315, in accordance with various aspects of the present disclosure. The UE 315 may be an example of one or more of the UEs 115, 215 of FIGS. 1 and/or 2. The UE 315 may include a receiver module 305, a connection request control module 310, and a transmitter module 320. Each of these components may be in communication with each other.

These components of the UE 315 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one example, the receiver module 305 may include a cellular receiver and may receive responses to requests to connect to a base station (e.g., one of the base stations 105 of FIG. 1 or eNBs 205 of FIG. 2). The connection request control module 310 may control the transmission of the requests to connect to the base station in a wireless communications network. In one example, the UE 315 may transmit a connection request via the transmitter module 320. In one example, the transmitter module 320 may include a cellular transmitter configured to transmit data and control signaling to the base station. In one example, the base station may not respond a connection request transmitted from the UE 315. For example, the base station may not receive the connection request or may be too congested to respond to the connection request. In another example, the base station may transmit a connection reject in response to receiving the connection request from the UE 315. The connection reject may be sent when the coverage area (e.g., cell) of the base station that may be congested (e.g., the cell already includes a certain number of active UEs). If a cell has too many UEs actively communicating with the base station, communication signals to/from the base station may deteriorate and information transmitted via these communication signals may not reach the intended recipient. In addition, the latency of such communication signals may be increased in a congested network. As a result, the connection request control module 310 may control a transmission of the control requests to the base station. Controlling the transmission of these control requests may prevent further congestion from being added to a congested network. In addition, the connection request control module 310 may identify potential periods of momentary congestion of the network and allow connection requests to resume after a brief period of time has passed. Details regarding the connection request control module 310 will be described below.

Figure 4:
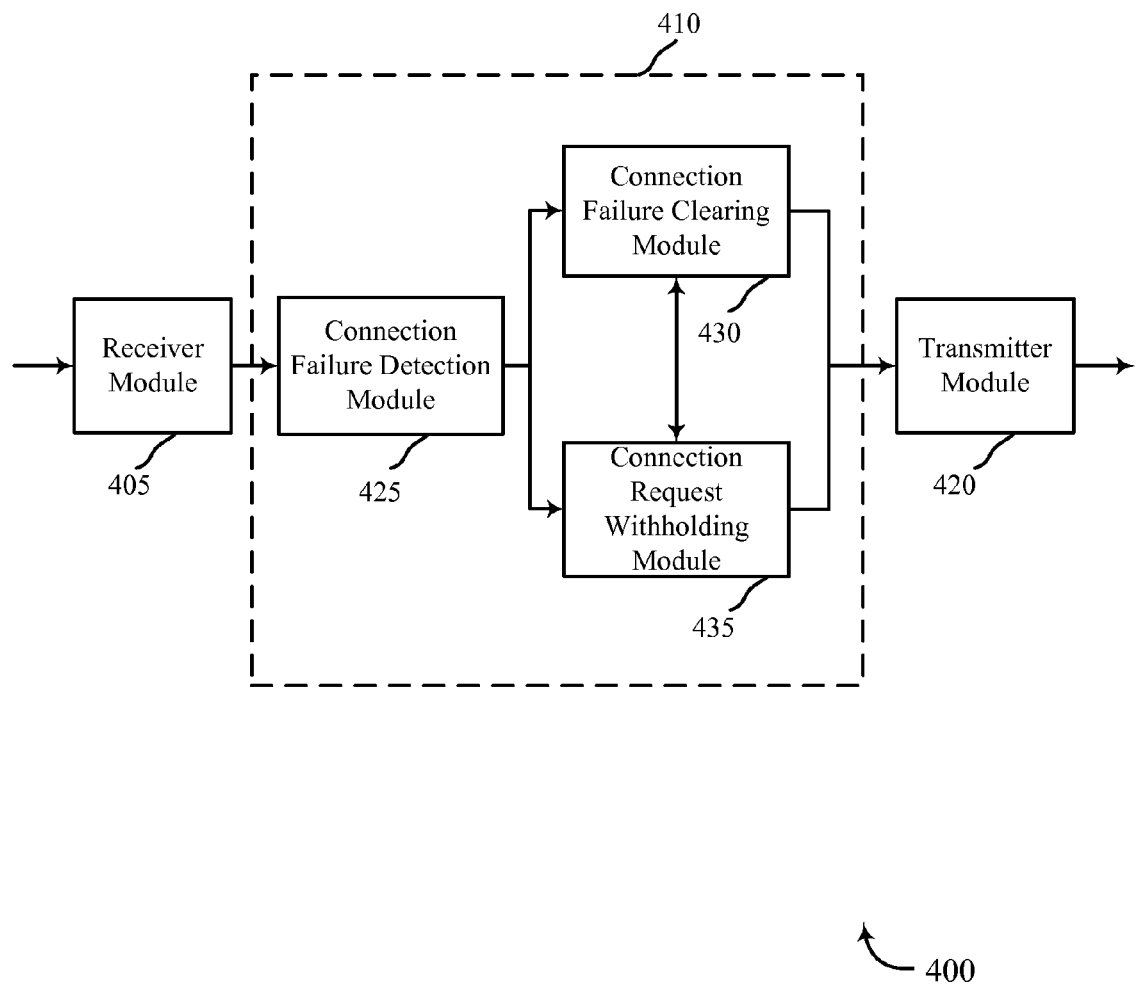
FIG. 4 is a block diagram illustrating one example of a connection request control module, in accordance with various aspects of the present disclosure.

FIG. 4 is a block diagram 400 illustrating one example of a connection request control module 410 in accordance with various aspects of the present disclosure. The connection request control module 410 of FIG. 4 may be an example of the connection request control module 310 described in FIG. 3. The connection request control module 410 may be in communication with a receiver module 405 and a transmitter module 420. In one example, the connection request control module 410 may include a connection failure detection module 425, a connection failure clearing module 430, and a connection request withholding module 435. Each of these components may be in communication with each other.

These components may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one example, the receiver module 405 may receive a message in response to a request to connect to a base station (e.g., one of the base stations 105 and/or eNBs 205 of FIG. 1 or FIG. 2) that was transmitted via the transmitter module 420. The connection failure detection module 425 may determine whether the received message is a connection failure message. A connection failure message may represent a failure of the UE to connect to the base station. In another configuration, the receiver module 405 may not receive a message in response to a request to connect to a base station that was transmitted via the transmitter module 420. The connection failure detection module 425 may also determine a connection failure has occurred based on the expiration of a response timer. When a connection failure is determined, the connection failure clearing module 430 may determine whether to clear (i.e., forget) information relating to previously received connection failure messages. In one example the connection request control module 410 may maintain information relating to received connection failure messages. The connection failure clearing module 430 may determine whether information for each previously received failure message (or information for a subset of previously received failure messages) should be cleared from memory of the UE.

The connection request withholding module 435 may determine a period of time to withhold the transmission of future connection requests upon the receipt of one or more connection failure messages. In one example, the connection request withholding module 435 may hold future messages for a period of time (e.g., withholding time period). The transmission of future connection requests may be withheld to prevent the addition of congestion to a network. Following the expiration of the withholding time period, the connection request withholding module 435 may allow the transmission of connection requests to resume via the transmitter module 420. Details regarding the connection failure detection module 425, the connection failure clearing module 430, and the connection request withholding module 435 are described below.

Figure 5:
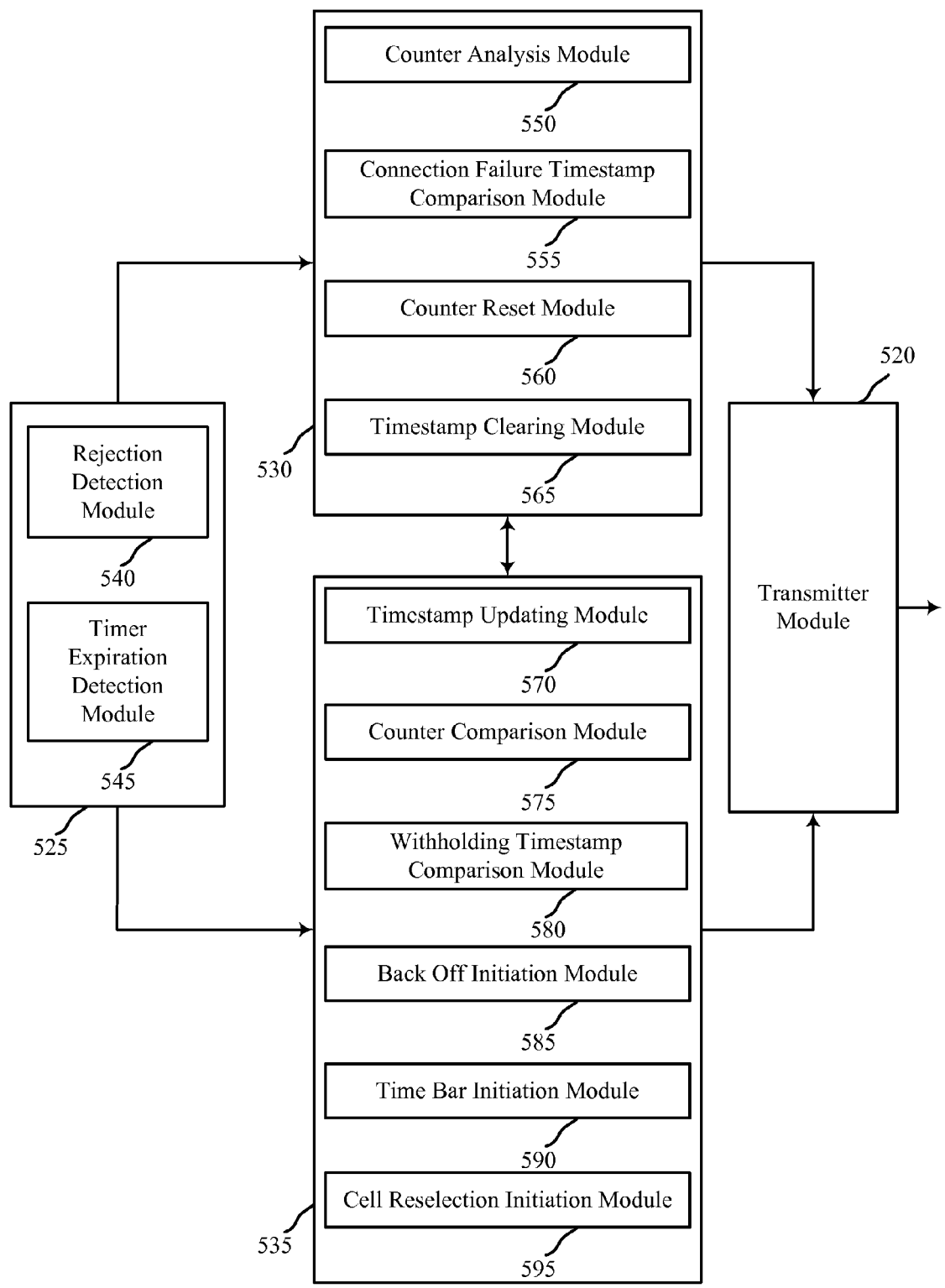
FIG. 5 is a block diagram illustrating one example of various modules to reduce network congestion in a wireless communications system, in accordance with various aspects of the present disclosure.

FIG. 5 is a block diagram 500 illustrating one example of various modules to reduce network congestion in a wireless communications systems, in accordance with various aspects of the present disclosure. Specifically, FIG. 5 shows one example of a connection failure detection module 525, a connection failure clearing module 530, a connection request withholding module 535, and a transmitter module 520. The connection failure detection module 525, the connection failure clearing module 530, the connection request withholding module 535, and the transmitter module 520 may be examples of the connection failure detection module 425, the connection failure clearing module 430, the connection request withholding module 435, and the transmitter module 420 described in FIG. 4, respectively. The connection failure detection module 525, the connection failure clearing module 530, the connection request withholding module 535, and the transmitter module 520 may be embodied within a UE (e.g., one or more of the UEs 115 of FIG. 1, the UE 215 of FIG. 2, and/or the UE 315 of FIG. 3).

The components illustrated in FIG. 5 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one example, the connection failure detection module 525 may include a rejection detection module 540 and a timer expiration detection module 545. The rejection detection module 540 may detect when a connection rejection message is received in response to a connection request message. In one example, the timer expiration detection module 545 may detect when a period of time expires in which no response has been received to a connection request. The connection failure detection module 525 may detect when either of these events occur (e.g., receipt of a connection reject message and/or expiration of a period of time in which no response was received) and may classify each event as a connection failure.

The connection failure clearing module 530 may determine when to clear stored information relating to previously received connection failures. In one example, this may include resetting a counter that maintains a count of connection failures that have occurred. This may also include clearing a memory location storing information relating to previously received connection failures. The connection failure clearing module 530 may include a counter analysis module 550, a connection failure timestamp comparison module 555, a counter reset module 560, and a timestamp clearing module 565.

In one example, when the connection failure detection module 525 detects the occurrence of a connection failure, the counter analysis module 550 may identify the current value of a counter that maintains a count of connection failures. In one example, the counter may be included in the counter analysis module 550. In another example, the counter may be included in a counter module that is in communication one or more modules of the connection failure clearing module 530 and/or one or more modules of the connection request withholding module 535. The counter analysis module 550 may determine whether the value of the counter is equal to a certain value, such as zero. In one example, if the value of the counter is determined to be zero, then the connection failure timestamp comparison module 555 may store the timestamp of the detected connection failure in an earliest failure data field as a first connection failure, and the value of the counter may be incremented to one. If, however, the value of the counter is determined to be a value greater than zero, then the connection failure timestamp comparison module 555 may compare a timestamp of a current (e.g., second, the detected) connection failure with a previously stored timestamp of a (e.g., first) connection failure that previously occurred (e.g., the first connection failure). Based on the results of the comparison, the connection failure clearing module 530 may determine to clear the connection failure or the connection request withholding module 535 may determine to withhold future connection requests.

If the connection failure clearing module 530 determines to clear the connection failure (e.g., the interval between the previously stored timestamp and the timestamp of the current connection failure satisfies a threshold), the counter reset module 560 may reset the value of the counter to a certain value, such as zero. In addition, the timestamp clearing module 565 may erase or clear stored information relating to previously received timestamps. In another example, the connection failure clearing module 530 may adjust a weight associated with one or more previous connection failures based at least in part on the interval between the timestamp of the most recent connection failure and a previously stored timestamp. For example, a consecutive connection failure with a shorter interval may be weighted higher than a consecutive connection failure with a longer interval. In one example, the threshold determination may be based on weighted data (e.g., weighted timestamps).

If the connection request withholding module 535 determines to hold future connection requests (e.g., the interval between the previously stored timestamp and the timestamp of the current connection failure does not satisfy a threshold), the connection request withholding module 535 may prevent such requests from being transmitted to a base station for a period of time. In one example, the connection request withholding module 535 may include a timestamp updating module 570, a counter comparison module 575, a withholding timestamp comparison module 580, a back off initiation module 585, a time bar initiation module 590, and a cell reselection initiation module 595.

In one example, the timestamp updating module 570 may update a memory location storing information for received timestamps of connection failures. For example, the memory may include an earliest failure data field which stores information relating to the first timestamp received during a time period. The memory may also include a last failure data field that stores information relating to the second timestamp of the most recent connection failure occurrence. When a new connection failure is detected, the timestamp updating module 570 may update the last failure data field with information relating to the timestamp of this new connection failure. The counter comparison module 575 may compare the value of the counter that indicates the number of connection failures that have occurred with a counter threshold. Based on the results of the comparison, the withholding timestamp comparison module 580 may compare the timestamp of the most recently detected connection failure (e.g., second timestamp) with the timestamp of the connection failure that was first detected (e.g., first timestamp) during a time period.

In one example, the back off initiation module 585 may initiate a back off timer. The back off timer may represent a first period of time in which a future connection request is withheld from being transmitted to the base station. In one example, the time bar initiation module 590 may initiate a time bar timer that represents a second period of time during which a future connection request is withheld. The second period of time (i.e., the barring time) may be longer than the first period of time (i.e., the back off time). The determination of whether to initiate the back off timer or the time bar timer may depend on the results of the timestamp comparison performed by the withholding timestamp comparison module 580. For example, the back off initiation module 585 may initiate a back off timer when the interval between the first timestamp (e.g., earliest failure data) and the second timestamp (e.g., last failure data) is less than a threshold, such as one minute, and the time bar initiation module 590 may initiate a time bar timer when the interval between the first timestamp and the second timestamp is greater than the threshold. In one example, the period of time for the back off timer may be equal to the threshold minus the interval. Upon the expiration of the back off timer or the time bar timer, the connection request withholding module 535 may allow a connection request to once again be transmitted to the base station via the transmitter module 520.

In one example, during a back off time and/or a barring time, the cell reselection initiation module 595 may initiate procedures on the UE to reselect a different cell (e.g., a different base station). For example, when the cell reselection procedures are initiated, the UE may identify a different cell with an acceptable signal strength. The UE may begin to transmit connection request messages to the identified cell to perform the cell reselection. In one example, the connection request withholding module 535 may operate independently with respect to each cell.

Figure 6:
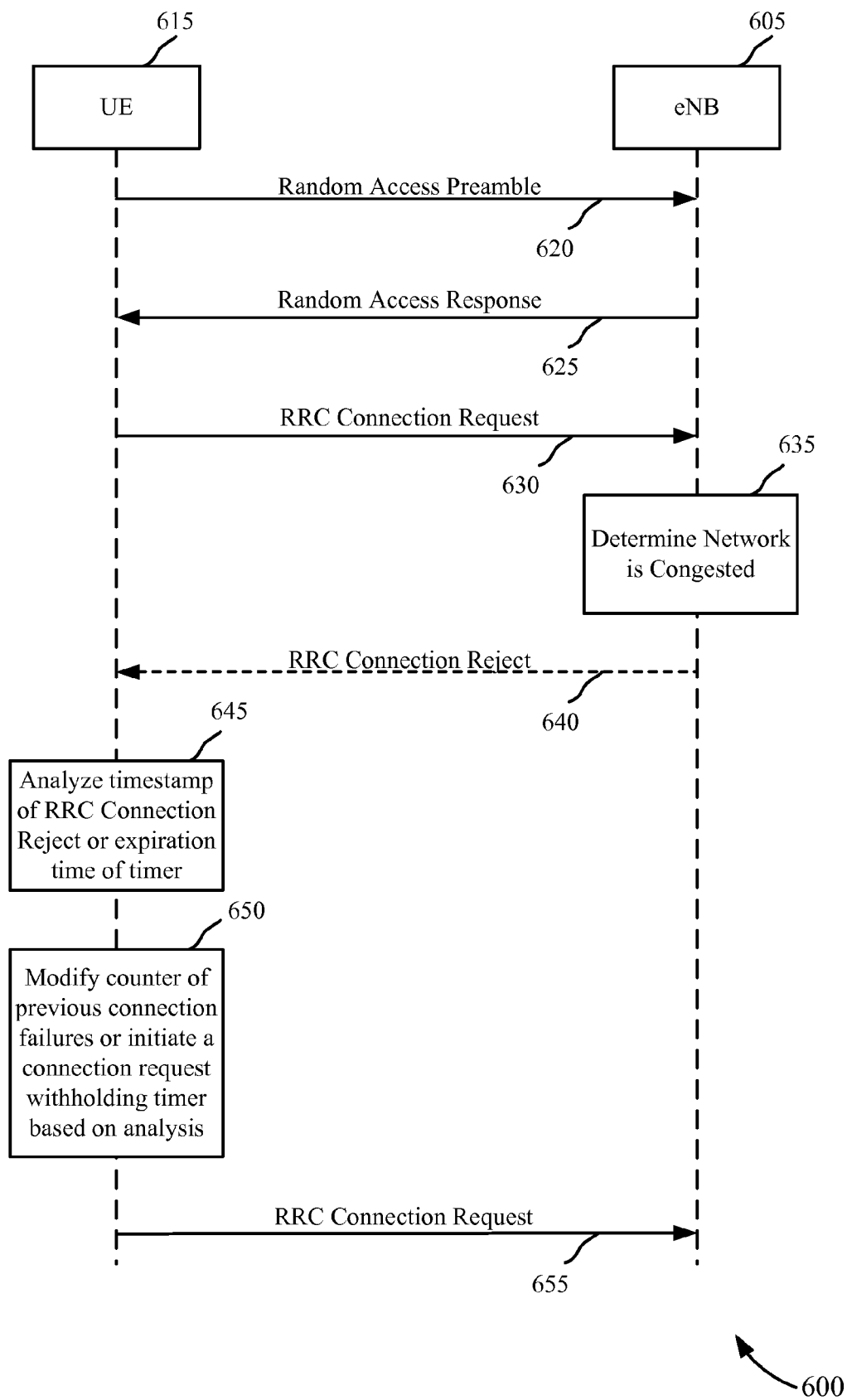
FIG. 6 is a message flow diagram of a connection procedure between an eNB and a UE, in accordance with various aspects of the present disclosure.

FIG. 6 is a message flow diagram 600 of a connection procedure between an eNB 605 and a UE 615, in accordance with various aspects of the present disclosure. The eNB 605 may be an example of one or more of the base stations 105 of FIG. 1 and/or one or more of the eNBs 205-a, 205-b of FIG. 2. The UE 615 may be an example of one or more of the UEs 115 of FIG. 1, the UE 215 of FIG. 2, and/or the UE 315 of FIG. 3.

In one example, control messages transmitted from the eNB 605 to the UE 615 may originate from a Radio Resource Control (RRC) component within the eNB 605. The RRC may handle radio access network (RAN) procedures including the broadcast of system information necessary for the UE 615 to be able to communication with a cell, transmission of paging messages to notify the UE 615 about incoming connection requests originating from the network, connection management, cell (re)selection, handling of UE 615 capabilities, etc.

In one example, the UE 615 may be in either an RRC_CONNECTED state or an RRC_IDLE state. In the RRC_CONNECTED state, parameters needed for communication between the UE 615 and a RAN are known by both the UE 615 and the network. While in the RRC_CONNECTED state, data may be transferred to/from the UE 615. If the uplink from the UE 615 is synchronized with the network, the UE 615 may be considered to be in-sync. Conversely, if the uplink is not synchronized, the UE 615 is considered to be out-of-sync. For example, if no uplink transmission has occurred within a time period, timing alignment between the uplink and network may not occur and the uplink becomes out-of-sync with the timing of the network.

While in the RRC_IDLE state, no transfer of data may occur to/from the UE 615. When the UE 615 is in the RRC_IDLE state and/or out-of-sync with the network, the UE 615 may perform a random-access procedure to restore uplink synchronization prior to the transmission of uplink data or control information. As part of this procedure, the UE 615 may transmit a random access preamble 620 to the eNB 605. The random access preamble 620 may indicate to the eNB 605 the presence of a random access attempt and may also allow the eNB 605 to estimate the delay between the eNB 605 and the UE 615.

In response to the transmission of the random access preamble 620, the eNB 605 may transmit a random access response 625. The random access response 625 may include an index of the random access preamble sequences the network detected and timing correction information calculated by a random access preamble receiver of the eNB 605. The UE 615 may adjust the timing of the uplink according to the timing correction information and transmit a first RRC connection request 630 to the eNB 605. In one example, the first RRC connection request 630 may include an identifier for the UE 615. If the UE 615 is in the RRC_CONNECTED state, an identifier has been assigned to the UE 615. Otherwise, a core-network identifier may be used. Further, if the UE 615 is in the RRC_IDLE state, the eNB 605 may communicate with the core network prior to responding to the first RRC connection request 630. For example, the eNB 605 may determine 635 that the network is congested and that no additional UEs should be granted access to communicate with this particular eNB 605. As a result, the eNB 605 may respond to the first RRC connection request 630 with an RRC connection reject 640. In another example, the eNB 605 may simply ignore the first RRC connection request 630 and not respond to the request.

Upon receiving the RRC connection reject 640 (or upon expiration of a response timer), the UE 615 may analyze 645 a timestamp of the RRC connection reject 640 (or a timestamp associated with the expiration of the response timer). Based on this analysis, the UE 615 may modify 650 a counter of one or more previous connection failures or initiate a connection request withholding timer (e.g., back off timer or time bar timer). For example, the UE 615 may back off for a particular period of time before transmitting a second RRC connection request 655. The withholding timer may also include the UE 615 withholding the transmission of the second RRC connection request 655 for a barring time, that may be longer than the back off period of time. If the UE 615 initiates the time bar timer, it may initiate a reselection process to select a different cell and begin the connection procedure with a new cell. In one example, the second RRC connection request 655 may be transmitted to the eNB 605 after clearing the connection failure counter, at the expiration of the back off time, and/or at the expiration of the time bar timer.

Figure 7:
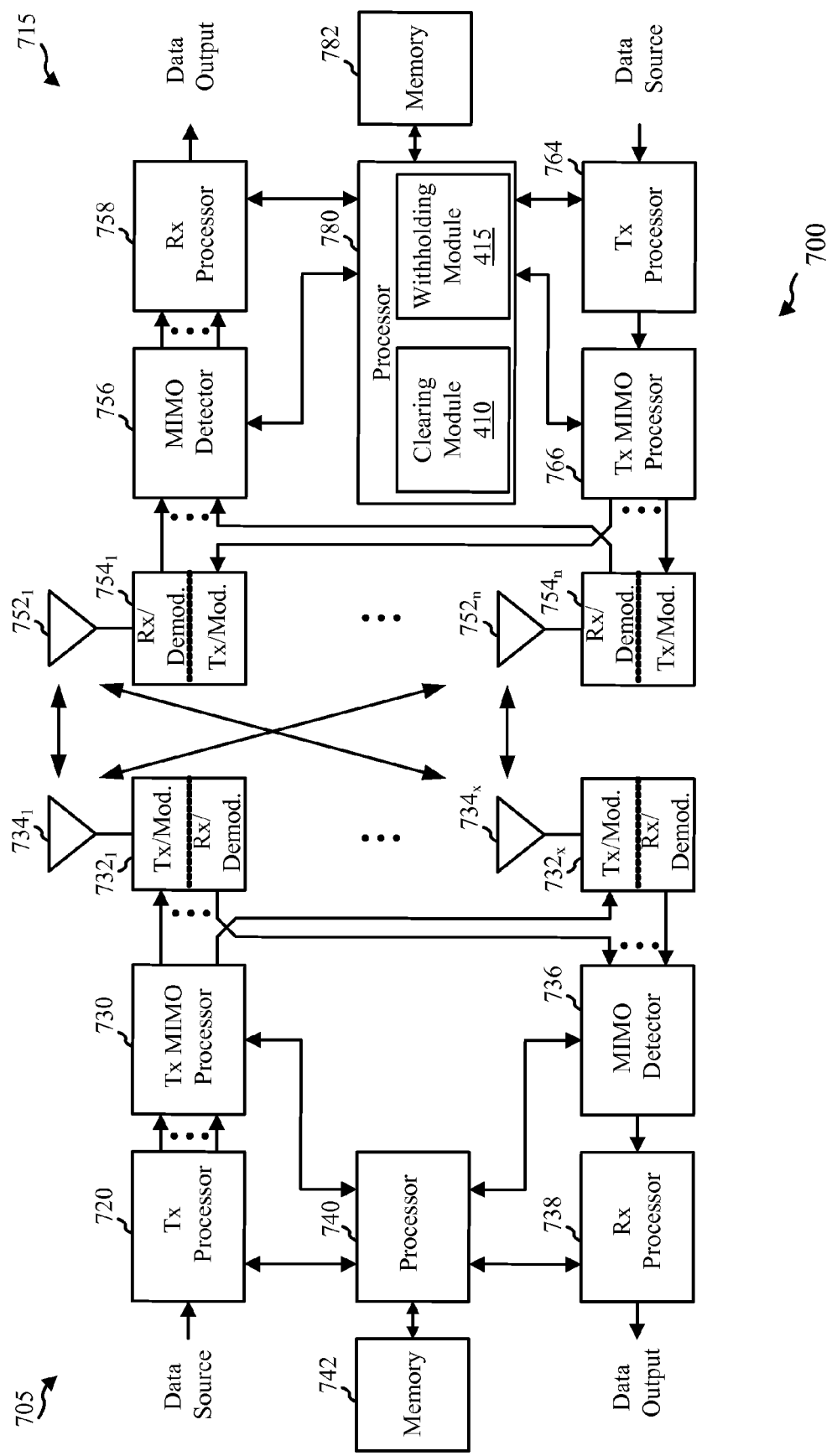
FIG. 7 is a block diagram of a MIMO communication system including a base station and a UE, in accordance with various aspects of the present disclosure.

FIG. 7 is a block diagram of a MIMO communication system 700 including a base station 705 and a UE 715, in accordance with various aspects of the present disclosure. This MIMO communication system 700 may illustrate aspects of the wireless communications system 100 of FIG. 1 and/or the EPS 200 of FIG. 2. The base station 705 may be equipped with base station antennas $734_1$ through $734_x$, and the UE 715 may be equipped with UE antennas $752_1$ through $752_n$, where x and n are positive integers. In the MIMO communication system 700, the base station 705 may be able to send data over multiple communication links at the same time. Each communication link may be called a "layer" and the "rank" of the communication link may indicate the number of layers used for communication. For example, in a 2×2 MIMO system where the base station 705 transmits two "layers," the rank of the communication link between the base station 705 and the UE 715 is two.

At the base station 705, a base station transmit processor 720 may receive data from a base station data source. The base station transmit processor 720 may process the data. The base station transmit processor 720 may also generate reference symbols, and a cell-specific reference signal. A base station transmit (TX) MIMO processor 730 may perform spatial processing (e.g., precoding) on data symbols, control symbols, and/or reference symbols, if applicable, and may provide output symbol streams to base station modulator/demodulators $732_1$ through $732_x$. Each base station modulator/demodulator 732 may process a respective output symbol stream (e.g., for OFDM, etc.) to obtain an output sample stream. Each base station modulator/demodulator 732 may further process (e.g., convert to analog, amplify, filter, and upconvert) the output sample stream to obtain a downlink signal. In one example, downlink signals from base station modulator/demodulators $732_1$ through $732_x$ may be transmitted via the base station antennas $734_1$ through $734_x$, respectively.

At the UE 715, the UE antennas $752_1$ through $752_n$ may receive the DL signals from the base station 705 and may provide the received signals to the UE modulator/demodulators $754_1$ through $754_n$, respectively. Each UE modulator/demodulator 754 may condition (e.g., filter, amplify, down-convert, and digitize) a respective received signal to obtain input samples. Each UE modulator/demodulator 754 may further process the input samples (e.g., for OFDM, etc.) to obtain received symbols. A UE MIMO detector 756 may obtain received symbols from all the UE modulator/demodulators $754_1$ through $754_n$, perform MIMO detection on the received symbols if applicable, and provide detected symbols. A UE receive processor 758 may process (e.g., demodulate, deinterleave, and decode) the detected symbols, providing decoded data for the UE 715 to a UE data output, and provide decoded control information to a UE processor 780, and/or UE memory 782. In one example, the UE processor 780 may include a connection failure clearing module 430 and a connection request withholding module 435 to implement the systems and methods described herein. The connection failure clearing module 430 and connection request withholding module 435 may be examples of the connection failure clearing module 430 and connection request withholding module 435, respectively, of FIGS. 4 and/or 5.

On the uplink (UL), at the UE 715, a UE transmit processor 764 may receive and process data from a UE data source. The UE transmit processor 764 may also generate reference symbols for a reference signal. The symbols from the UE transmit processor 764 may be precoded by a UE transmit MIMO processor 766 if applicable, further processed by the UE modulator/demodulators $754_1$ through $754_n$ (e.g., for SC-FDMA, etc.), and be transmitted to the base station 705 in accordance with the transmission parameters received from the base station 705. At the base station 705, the UL signals from the UE 715 may be received by the base station antennas 734, processed by the base station modulator/demodulators 732, detected by a base station MIMO detector 736 if applicable, and further processed by a base station receive processor 738. The base station receive processor 738 may provide decoded data to a data output and to the base station processor 740 and/or base station memory 742.

The components of the UE 715 may, individually or collectively, be implemented with one or more Application Specific Integrated Circuits (ASICs) adapted to perform some or all of the applicable functions in hardware. Each of the noted modules may be a means for performing one or more functions related to operation of the MIMO communication system 700. Similarly, the components of the base station 705 may, individually or collectively, be implemented with one or more Application Specific Integrated Circuits (ASICs) adapted to perform some or all of the applicable functions in hardware. Each of the noted components may be a means for performing one or more functions related to operation of the MIMO communication system 700.

The communication networks that may accommodate some of the various disclosed examples may be packet-based networks that operate according to a layered protocol stack. For example, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. At the Physical layer, the transport channels may be mapped to Physical channels.

Figure 8:
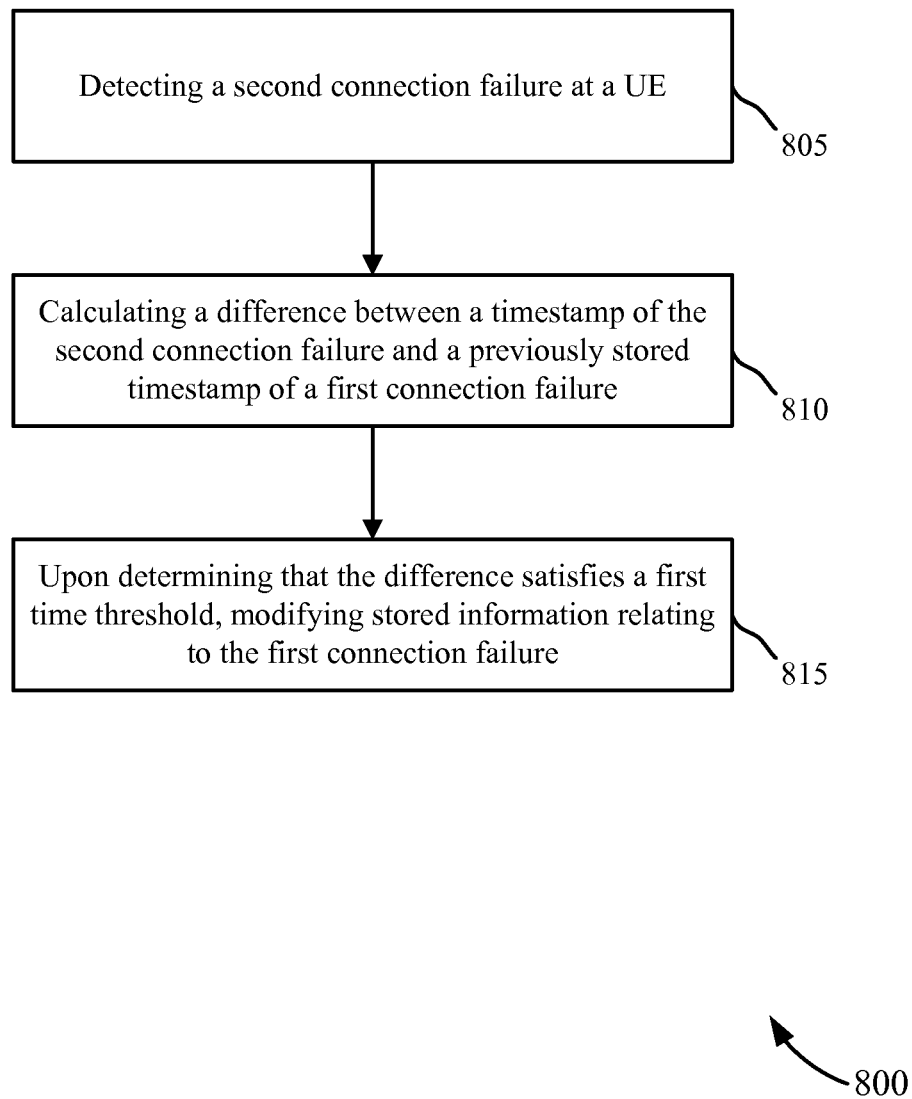
FIG. 8 is a flow chart illustrating one example of a method to clear information relating to one or more previous connection failures, in accordance with various aspects of the present disclosure.

FIG. 8 is a flow chart illustrating one example of a method 800 to clear information relating to one or more previous connection failures, in accordance with various aspects of the present disclosure. For clarity, the method 800 is described below with reference to a UE (e.g., one or more of the UEs 115 of FIG. 1, the UE 115 of FIG. 2, the UE 315 of FIG. 3, and/or the UE 615 of FIG. 6). In one implementation, the connection request control module 310 of FIGS. 3, 4, and/or 5 may execute one or more sets of codes to control the functional elements of the UE to perform the functions described below.

At block 805, a second connection failure may be detected. The detection of the second connection failure may be the receipt of an RRC connection reject message. Alternatively, the detection of the second connection failure may be based at least in part on the expiration of a response timer, such as the expiration of a T300 timer used in LTE systems. The T300 timer defines the length of time the UE waits for a response to an RRC connection request message transmitted to a base station.

At block 810, a difference between a timestamp of the second connection failure and a previously stored timestamp of a first connection failure may be calculated. The calculated difference may be compared to a first time threshold. Upon determining that the difference satisfies the first time threshold, at block 815, stored information relating to one or more previous connection failures may be modified. In one example, a counter maintaining a count of connection failures may be reset to a value, such as zero. In addition, previously stored timestamps for previous connection failures may be removed from a memory location on the UE 115.

Therefore, the method 800 may provide for clearing (i.e., forgetting) information relating to previous connection failures. It should be noted that the method 800 is just one implementation and that the operations of the method 800 may be rearranged or otherwise modified such that other implementations are possible.

Figure 9:
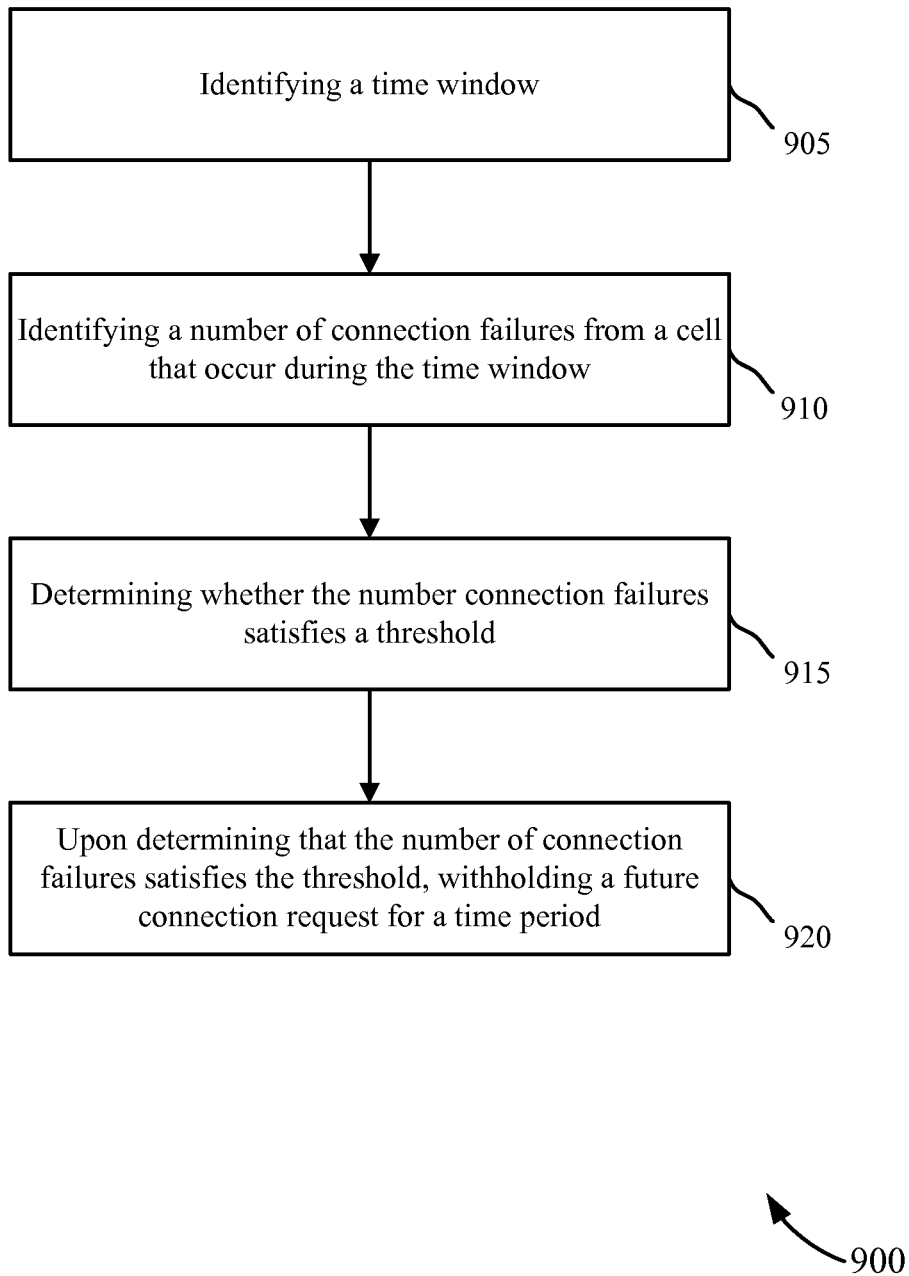
FIG. 9 is a flow chart illustrating one example of a method to withhold a future connection request for a time period, in accordance with various aspects of the present disclosure.

FIG. 9 is a flow chart illustrating one example of a method 900 to withhold a future connection request for a time period, in accordance with various aspects of the present disclosure. For clarity, the method 900 is described below with reference to a UE (e.g., one or more of the UEs 115 of FIG. 1, the UE 115 of FIG. 2, the UE 315 of FIG. 3, and/or the UE 615 of FIG. 6). In one implementation, the connection request control module 310 of FIGS. 3, 4, and/or 5 may execute one or more sets of codes to control the functional elements of the UE 115 to perform the functions described below.

At block 905, a time period may be identified. At block 910, a number of connection failures from a cell that occur during the time period may be identified. For example, a counter may maintain the number of connection failures that occur during the time period. At block 915, a determination is made as to whether the number of connection failures satisfies a threshold. At block 920, upon determining that the number of connection failures satisfies the threshold, a future connection request may be withheld for a time period. The time period may be a back off time or a barring time. In one example, the back off time may be shorter than the barring time.

Therefore, the method 900 may provide for withholding future connection requests from being transmitted to the base station for a certain time period to reduce network congestion created by the uplink transmission of connection requests. It should be noted that the method 900 is just one implementation and that the operations of the method 900 may be rearranged or otherwise modified such that other implementations are possible.

Figure 10:
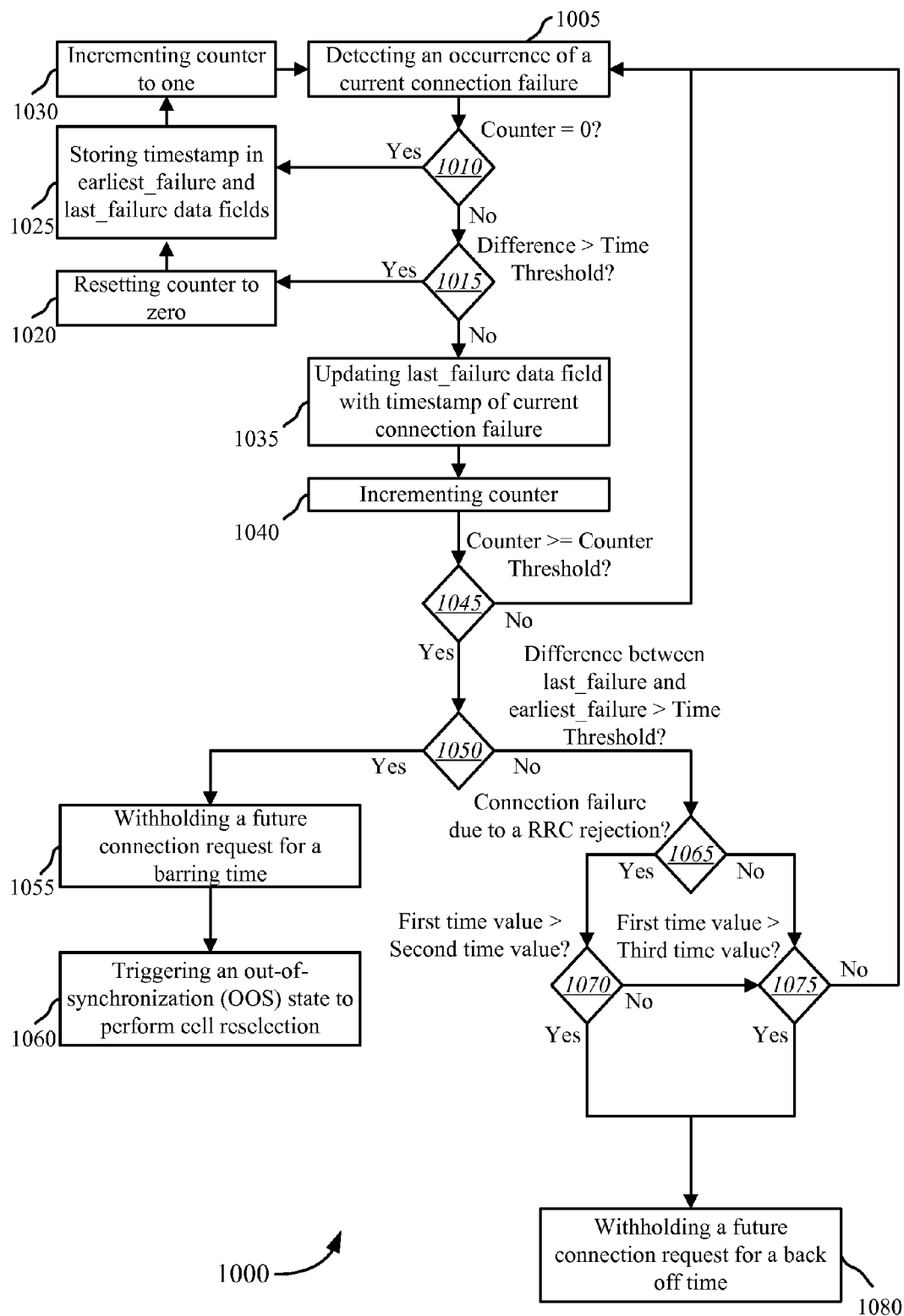
FIG. 10 is a flow chart illustrating one example of a method to reduce congestion in a network by clearing information relating to previous connection failures and/or withholding future connection requests for a time period, in accordance with various aspects of the present disclosure.

FIG. 10 is a flow chart illustrating one example of a method 1000 to reduce congestion in a network by clearing information relating to previous connection failures and/or withholding future connection requests for a time period, in accordance with various aspects of the present disclosure. For clarity, the method 1000 is described below with reference to a UE (e.g., one or more of the UEs 115 of FIG. 1, the UE 115 of FIG. 2, the UE 315 of FIG. 3, and/or the UE 615 of FIG. 6). In one implementation, the connection request control module 310 of FIGS. 3, 4, and/or 5 may execute one or more sets of codes to control the functional elements of the UE to perform the functions described below.

At block 1005, an occurrence of a current connection failure may be detected. The occurrence may be detected by the receipt of an RRC connection reject message in response to an RRC connection request message. The occurrence may additionally or alternatively be detected by the non-receipt of an RRC response at the expiration of a response timer, such as, but not limited to, a T300 timer used in LTE systems.

Upon detecting the occurrence of the current connection failure, a determination 1010 may be made as to whether a counter is equal to zero. The counter maintains a count of connection failures that have occurred. If it is determined that the counter equals zero (i.e., the current connection failure is the earliest detected connection failure during a time period), at block 1025, a timestamp of the current failure may be stored in an earliest failure data field and a last failure data field. At block 1030, the counter may increment to one.

If, however, the counter does not equal zero, a determination 1015 may be made as to whether the difference between the timestamp of the current connection failure and a timestamp of the previous connection failure (the timestamp stored in the last failure data field) is greater than a time threshold. It should be noted that the determination 1015 may be as to whether the difference between the timestamp of the current connection failure and a timestamp of the previous connection failure is greater than the time threshold.

As an example, the time threshold may be equal to one minute. If it is determined that the difference between the timestamps of the current connection failure and the previous connection failure is greater than the time threshold, the counter may be reset to zero at block 1020, the timestamp of the current failure may be stored in the earliest failure data field and the last failure data field at block 1025, and the counter may be incremented or reset to one at block 1030. Thus, when a connection failure is detected after a period of time (e.g., the time threshold), information relating to the previous connection failures may be cleared (e.g., resetting the timer).

If, however, it is determined at 1015, that the difference between timestamps is not greater than the time threshold, the last failure data field may be updated with the timestamp of the current connection failure at block 1035. At block 1040, the counter may be incremented. A determination 1045 may be made as to whether the counter is greater than or equal to a counter threshold. If it is determined that the counter is not greater than or equal to the counter threshold, the method 1000 may return to block 1005 to detect the occurrence of another connection failure (without resetting the counter). If, however, it is determined that the counter is greater than or equal to the counter threshold, a determination 1050 may be made as to whether the difference between the timestamp stored in the last failure data field and the timestamp stored in the earliest failure data field is greater than the time threshold. If it is determined that the difference is greater than the time threshold, a future connection request may be withheld 1055 from being transmitted for a barring time. In one example, the barring time may be configurable via the EFS. At block 1060, an out-of synchronization (OOS) state may be triggered (as explained above) to perform cell reselection.

In one example, when cell reselection occurs, stored information relating to previous connection failures may be cleared from the memory of the UE. In another example, at cell reselection, the UE may retain stored information relating to one or more previous connection failures.

In some examples, the UE may return to the coverage area of a particular cell ("the original cell") and perform RRC procedures to establish a connection with the base station serving this cell. Upon returning to the cell, a determination may be made as to whether the difference between a current timestamp of a connection failure (from the original cell) and a stored timestamp of a previous connection failure that occurred before cell reselection (i.e., before the UE left the coverage area of the original cell). If it is determined that the difference is below a threshold, the stored timestamp of the previous connection failure may be replaced with the timestamp of the current connection failure. In addition, a counter of connection failures may be updated. If, however, it is determined that the difference exceeds the threshold, stored information relating to one or more previous connection failures from the original cell may be cleared.

Returning to the determination 1050, if the difference between the timestamps stored in the last failure data field and the earliest failure data field is not greater than the time threshold, a determination 1065 may be made as to whether the connection failure is detected from the receipt of a connection reject message, such as an RRC connection reject message. If the failure is detected from the receipt of the RRC connection reject message, a determination 1070 may be made as to whether a first time value is greater than a second time value. In one example, the first time value may include the difference between the time threshold (for example, one minute) and the difference between the timestamps of the last failure and the earliest failure (i.e., time threshold—difference between last failure and earliest failure). The second time value may include a timer initiated by the UE upon receiving the connection failure and a latency value. The timer may be a T302 timer that is initiated when the UE 115 detects the occurrence of an RRC connection reject. The latency value may be a value between zero and a minimum time required for a connection establishment procedure (e.g., one second).

If it is determined 1070 that the first time value is greater than the second time value, a future connection request may be withheld for a back off time at block 1080. In one example, the back off time may be the first time value described above (i.e., time threshold—difference between last failure and earliest failure). As an example, the time threshold may be one minute. The timestamp of the earliest failure may indicate that the earliest connection failure of the time period was received at 00 seconds and the timestamp of the last failure may indicate that the current rejection was received at 10 seconds (i.e., a difference of ten seconds). Thus, in this example, the back off time is 50 seconds (60 seconds-10 seconds).

If, however, it is determined 1070 that the first time value is not greater than the second time value, a determination 1075 may be made as to whether the first time value is greater than a third time value. The third time value may be the latency value. If the first time value is greater than the third time value, the future connection request may be withheld for the back off time at block 1080. If, however, it is determined that the first time value is not greater than the third time value, the method 1000 may return to block 1005 to detect the occurrence of another connection failure.

Therefore, the method 1000 may provide for reducing congestion in a network by clearing information relating to previous connection failures and/or withholding future connection requests for a time period. It should be noted that the method 1000 is just one implementation and that the operations of the method 1000 may be rearranged or otherwise modified such that other implementations are possible.

Figure 11:
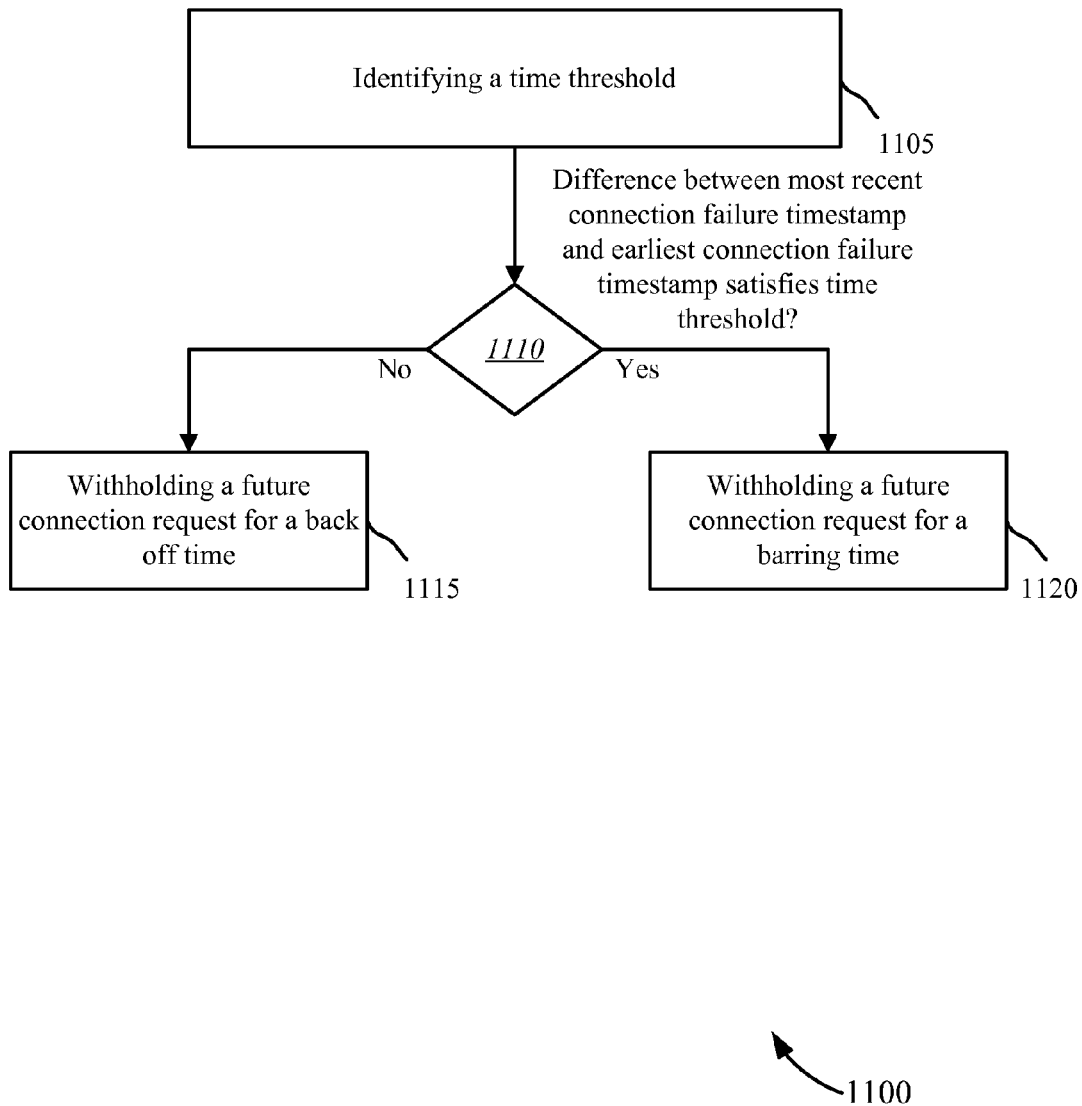
FIG. 11 is a flow chart illustrating one example of a method to reduce congestion in a network by withholding future connection requests for a time period, in accordance with various aspects of the present disclosure.

FIG. 11 is a flow chart illustrating one example of a method 1100 to reduce congestion in a network by withholding future connection requests for a time period, in accordance with various aspects of the present disclosure. For clarity, the method 1100 is described below with reference to a UE (e.g., one or more of the UEs 115 of FIG. 1, the UE 115 of FIG. 2, the UE 315 of FIG. 3, and/or the UE 615 of FIG. 6). In one implementation, the connection request control module 310 of FIGS. 3, 4, and/or 5 may execute one or more sets of codes to control the functional elements of the UE to perform the functions described below.

At block 1105, a time threshold may be identified. At block 1110, a determination may be made as to whether a difference between a last received timestamp of a last detected connection failure and a first received timestamp of a first detected connection failure satisfies the time threshold. If it is determined that the difference satisfies the threshold, a future connection request may be withheld for a barring time at block 1120. If, however, it is determined that the difference does not satisfy the time threshold, the future connection request may be withheld for a back off time at block 1115. In one example, the back off time may be less than the barring time.

Therefore, the method 1100 may provide for reducing congestion in a network by withholding future connection requests for a time period. It should be noted that the method 1100 is just one implementation and that the operations of the method 1100 may be rearranged or otherwise modified such that other implementations are possible.

The detailed description set forth above in connection with the appended drawings describes exemplary examples and does not represent the only examples that may be implemented or that are within the scope of the claims. The term "exemplary" or "illustrative" used throughout this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-Ray disc where disks usually reproduce data magnetically, while discs reproduce data optically with lasers. Combinations of the above are also included within the scope of computer-readable media.

Techniques described herein may be used for various wireless communications systems such as cellular wireless systems, Peer-to-Peer wireless communications, wireless local access networks (WLANs), ad hoc networks, satellite communications systems, and other systems. The terms "system" and "network" are often used interchangeably. These wireless communications systems may employ a variety of radio communication technologies such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and/ or other radio technologies. Generally, wireless communications are conducted according to a standardized implementation of one or more radio communication technologies called a Radio Access Technology (RAT). A wireless communications system or network that implements a Radio Access Technology may be called a Radio Access Network (RAN).

Examples of Radio Access Technologies employing CDMA techniques include CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. Examples of TDMA systems include various implementations of Global System for Mobile Communications (GSM). Examples of Radio Access Technologies employing OFDM and/or OFDMA include Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communication, comprising:
    detecting a first connection failure at a user equipment (UE) in response to a first connection request, wherein a connection failure is detected based on at least one of an expiration of a response timer or a reception of a connection reject message;
    detecting a second connection failure at the UE in response to a second connection request;
    calculating a first difference between a timestamp of the second connection failure and a previously stored timestamp of the first connection failure;
    upon determining that the first difference satisfies a first time threshold, modifying, at the UE, stored information relating to one or more previous connection failures, wherein the one or more previous connection failures includes the first connection failure; and
    upon determining that the first difference fails to satisfy the first time threshold, withholding one of a future connection request for a barring time period or a future connection request for a back off time period.

2. The method of claim 1, further comprising:
    adjusting a weight associated with the one or more previous connection failures based at least on a size of an interval between a most recent connection failure and a previously stored timestamp.

3. The method of claim 1, wherein modifying information relating to the one or more previous connection failures comprises:
    resetting a counter of connection failures.

4. The method of claim 1, wherein modifying information relating to the one or more previous connection failures comprises:
    clearing stored timestamps of the one or more previous connection failures.

5. The method of claim 1, further comprising:
    updating a previously stored timestamp of an earliest connection failure to occur during a time period with the timestamp of the second connection failure; and
    initializing a counter of connection failures.

6. The method of claim 1, further comprising:
    upon determining that the first difference fails to satisfy the first time threshold, updating a previously stored timestamp of a last connection failure to occur during a time period with the timestamp of the second connection failure;
    incrementing a counter of connection failures; and
    determining whether the counter of connection failures satisfies a counter threshold.

7. The method of claim 6, further comprising:
    upon determining that the counter of connection failures satisfies the counter threshold, calculating a second difference between the timestamp of the last connection failure to occur during the time period and a timestamp of an earliest connection failure to occur during the time period; and
    determining whether the second difference satisfies a second time threshold.

8. The method of claim 7, wherein withholding one of the future connection request for the barring time period or the future connection request for the back off time period further comprises:
    upon determining that the second difference fails to satisfy the second time threshold, withholding the future connection request for the back off time period.

9. The method of claim 8, wherein withholding one of the future connection request for the barring time period or the future connection request for the back off time period further comprises:
    upon determining that the second difference satisfies the second time threshold, withholding the future connection request for the barring time period, the barring time period being greater than the back off time period.

10. The method of claim 1, wherein the second connection failure occurs subsequently to an occurrence of the first connection failure.

11. An apparatus for wireless communication, comprising:
    a processor;
    memory in electronic communication with the processor; and
    instructions stored in the memory, the instructions being executable by the processor to:
        detect a first connection failure at a user equipment (UE) in response to a first connection request, wherein a connection failure is detected based on at least one of an expiration of a response timer or a reception of a connection reject message;
        detect a second connection failure at the UE in response to a second connection request;

calculate a first difference between a timestamp of the second connection failure and a previously stored timestamp of the first connection failure;

upon determining that the first difference satisfies a first time threshold modify, at the UE, stored information relating to one or more previous connection failures, wherein the one or more previous connection failures includes the first connection failure; and upon determining that the first difference fails to satisfy the first time threshold, withhold one of a future connection request for a barring time period or a future connection request for a back off time period.

12. The apparatus of claim 11, wherein the instructions are further executable by the processor to:

adjust a weight associated with the one or more previous connection failures based at least on a size of an interval between a most recent connection failure and a previously stored timestamp.

13. The apparatus of claim 11, wherein the instructions to modify the information relating to the one or more previous connection failures are executable by the processor to:

reset a counter of connection failures.

14. The apparatus of claim 11, wherein the instructions to modify the information relating to the one or more previous connection failures are executable by the processor to:

clear stored timestamps of the one or more previous connection failures.

15. The apparatus of claim 11, wherein the instructions are executable by the processor to:

update a previously stored timestamp of an earliest connection failure to occur during a time period with the timestamp of the second connection failure; and initialize a counter of connection failures.

16. The apparatus of claim 11, wherein upon determining that the first difference fails to satisfy the first time threshold, the instructions are executable by the processor to:

update a previously stored timestamp of a last connection failure to occur during a time period with the timestamp of the second connection failure;

increment a counter of connection failures; and determine whether the counter of connection failures satisfies a counter threshold.

17. The apparatus of claim 16, wherein upon determining that the counter of connection failures satisfies the counter threshold, the instructions are executable by the processor to:

calculate a second difference between the timestamp of the last connection failure to occur during the time period and a timestamp of an earliest connection failure to occur during the time period; and determine whether the second difference satisfies a second time threshold.

18. The apparatus of claim 17, wherein upon determining that the second difference fails to satisfy the second time threshold, the instructions are executable by the processor to:

withhold the future connection request for the back off time period.

19. The apparatus of claim 17, wherein upon determining that the second difference satisfies the second time threshold, the instructions are executable by the processor to:

withhold the future connection request for the barring time period, the barring time period being greater than the back off time period.

20. An apparatus for wireless communication, comprising:

means for detecting a first connection failure at a user equipment (UE) in response to a first connection request, wherein a connection failure is detected based on at least one of an expiration of a response timer or a reception of a connection reject message;

means for detecting a second connection failure at the UE in response to a second connection request;

means for calculating a first difference between a timestamp of the second connection failure and a previously stored timestamp of the first connection failure;

means for, upon determining that the first difference satisfies a first time threshold, modifying, at the UE, stored information relating to one or more previous connection failures, wherein the one or more previous connection failures includes the first connection failure; and means for, upon determining that the first difference fails to satisfy the first time threshold, withholding one of a future connection request for a barring time period or a future connection request for a back off time period.

21. The apparatus of claim 20, further comprising:

means for adjusting a weight associated with the one or more previous connection failures based at least on a size of an interval between a most recent connection failure and a previously stored timestamp.

22. The apparatus of claim 20, wherein the means for modifying the stored information relating to the one or more previous connection failures comprises:

means for resetting a counter of connection failures.

23. The apparatus of claim 20, wherein the means for modifying the stored information relating to the one or more previous connection failures comprises:

means for clearing stored timestamps of the one or more previous connection failures.

24. The apparatus of claim 20, further comprising:

means for updating a previously stored timestamp of an earliest connection failure to occur during a time period with the timestamp of the second connection failure; and means for initializing a counter of connection failures.

25. The apparatus of claim 20, further comprising:

means for, upon determining that the first difference fails to satisfy the first time threshold, updating a previously stored timestamp of a last connection failure to occur during a time period with the timestamp of the second connection failure;

means for incrementing a counter of connection failures; and means for determining whether the counter of connection failures satisfies a counter threshold.

26. The apparatus of claim 25, further comprising:

means for calculating, upon determining that the counter of connection failures satisfies the counter threshold, a second difference between the timestamp of the last connection failure to occur during the time period and a timestamp of an earliest connection failure to occur during the time period; and means for determining whether the second difference satisfies a second time threshold.

27. The apparatus of claim 26, wherein the means for withholding one of the future connection request for the barring time period or the future connection request for the back off time period comprises:

means for, upon determining that the second difference fails to satisfy the second time threshold, withholding the future connection request for the back off time period.

28. The apparatus of claim 26, wherein the means for withholding one of the future connection request for the barring time period or the future connection request for the back off time period comprises:

means for, upon determining that the second difference satisfies the second time threshold, withholding the future connection request for the barring time period, the barring time period being greater than the back off time period.

29. A computer program product for reducing congestion in a wireless communications system, the computer program product comprising a non-transitory computer-readable medium storing instructions for causing at least one processor to:

detect a first connection failure at a user equipment (UE) in response to a first connection request, wherein a connection failure is detected based on at least one of an expiration of a response timer or a reception of a connection reject message;

detect a second connection failure at the UE in response to a second connection request;

calculate a first difference between a timestamp of the second connection failure and a previously stored timestamp of the first connection failure;

upon determining that the first difference satisfies a first time threshold, modify, at the UE, stored information relating to one or more previous connection failures, wherein the one or more previous connection failures includes the first connection failure; and upon determining that the first difference fails to satisfy the first time threshold, withholding one of a future connection request for a barring time period or a future connection request for a back off time period.

30. The computer program product of claim 29, wherein the instructions cause the at least one processor to adjust a weight associated with the one or more previous connection failures based at least on a size of an interval between a most recent connection failure and a previously stored timestamp.

\* \* \* \* \*